United States Patent
Matsui

(10) Patent No.: US 11,591,520 B2
(45) Date of Patent: Feb. 28, 2023

(54) ALUMINA HYDRATE PARTICLES, FLAME RETARDANT, RESIN COMPOSITION AND ELECTRIC WIRE/CABLE

(71) Applicant: Konoshima Chemical Co., Ltd., Osaka (JP)

(72) Inventor: Seiji Matsui, Kagawa (JP)

(73) Assignee: KONOSHIMA CHEMICAL CO., LTD., Osaka (JP)

( * ) Notice: Subject to any disclaimer, the term of this patent is extended or adjusted under 35 U.S.C. 154(b) by 492 days.

(21) Appl. No.: 16/486,634

(22) PCT Filed: Mar. 28, 2018

(86) PCT No.: PCT/JP2018/012765
§ 371 (c)(1),
(2) Date: Aug. 16, 2019

(87) PCT Pub. No.: WO2018/198650
PCT Pub. Date: Nov. 1, 2018

(65) Prior Publication Data
US 2020/0056096 A1    Feb. 20, 2020

(30) Foreign Application Priority Data

Apr. 25, 2017 (JP) .............. JP2017-086167

(51) Int. Cl.
| | | |
|---|---|---|
| C09K 21/02 | (2006.01) | |
| C01F 7/023 | (2022.01) | |
| C01F 7/448 | (2022.01) | |
| C08K 3/22 | (2006.01) | |
| H01B 3/10 | (2006.01) | |
| H01B 3/44 | (2006.01) | |
| H01B 7/295 | (2006.01) | |

(52) U.S. Cl.
CPC .............. *C09K 21/02* (2013.01); *C01F 7/023* (2013.01); *C01F 7/448* (2013.01); *C08K 3/22* (2013.01); *H01B 3/10* (2013.01); *H01B 3/441* (2013.01); *H01B 7/295* (2013.01); *C01P 2004/03* (2013.01); *C01P 2004/61* (2013.01); *C01P 2004/62* (2013.01); *C01P 2006/12* (2013.01); *C08K 2003/2227* (2013.01); *C08K 2201/005* (2013.01); *C08K 2201/006* (2013.01)

(58) Field of Classification Search
None
See application file for complete search history.

(56) References Cited

U.S. PATENT DOCUMENTS

| | | | |
|---|---|---|---|
| 5,306,480 A * | 4/1994 | Brown | .............. C01F 7/46 423/625 |
| 2007/0082996 A1 | 4/2007 | Dittmar et al. | |

FOREIGN PATENT DOCUMENTS

| | | |
|---|---|---|
| JP | 2005-225976 A | 8/2005 |
| JP | 2007-532461 A | 11/2007 |
| JP | 2008-010303 A | 1/2008 |
| JP | 2009-126735 A | 6/2009 |
| JP | 2009-263597 A | 11/2009 |
| JP | 2013-189522 A | 9/2013 |
| WO | WO-2016/094665 | 6/2016 |

OTHER PUBLICATIONS

NPL Horiba Scientific Technical Note TN156 p. 1-4.*
Notice of Reasons for Refusal with English Translation issued in Japanese Application No. 2019-515173 dated Feb. 1, 2020, 10 pages.
International Search Report issued in PCT Application No. PCT/JP2018/012765 dated May 22, 2018, 2 pages.
International Preliminary Report on Patentability for PCT Application No. PCT/JP2018/012765 dated Nov. 7, 2019, 11 pages.

* cited by examiner

*Primary Examiner* — Robert T Butcher
(74) *Attorney, Agent, or Firm* — Foley & Lardner LLP

(57) ABSTRACT

The present invention provides alumina hydrate particles, a flame retardant and a resin composition that are each for an electric wire/cable covering material improvable in flame retardancy and mechanical properties while the covering material keeps acid resistance; such an electric wire/cable; and producing methods thereof. The alumina hydrate particles of the present invention for electric wire/cable covering material have an average particle size of 0.5 to 2.5 µm, and having a primary particle variation R of 24% or less, the variation R being represented by the following expression:

primary particle variation $R$ (%)="standard deviation$\sigma$(µm) of major axis diameters of the primary particles"/"average value(µm) of the major axis diameters of the primary particles"× 100.

7 Claims, 2 Drawing Sheets

ALUMINA HYDRATE PARTICLES, FLAME RETARDANT, RESIN COMPOSITION AND ELECTRIC WIRE/CABLE

CROSS-REFERENCE TO RELATED APPLICATIONS

This application is a national stage entry under 35 U.S.C. § 371 of International Patent Application No. PCT/JP2018/012765 filed Mar. 28, 2018, which claims priority to Japanese Patent Application No. 2017-086167 filed Apr. 25, 2017, the entire content of each of which is hereby incorporated by reference.

TECHNICAL FIELD

The present invention relates to alumina hydrate particles for electric wire/cable covering material; a flame retardant, for electric wire/cable covering material, including surface-treated alumina hydrate particles; a resin composition including the flame retardant; an electric wire/cable having a covering material formed using the resin composition; and producing methods thereof. These are useful as techniques for improving the covering material in acid resistance, flame resistance and mechanical properties thereof, and others.

BACKGROUND ART

Hitherto, a covering material for electric wires/cables or the like has required flame resistance, and other various properties, these electric wires/cables or the like being used, for example, for automobile vehicles, railway vehicles, ships, aircrafts, industrial machines, electronic instruments, and electronic components. Halogen-containing flame retardants and others have been widely used. However, a halogen-containing flame retardant gives a fear that when a material containing this agent is shaped and worked, halogen gas generated by the decomposition of this agent corrodes the shaping and working machine, or produces a bad effect onto the environment although this agent has an excellent flame retardant effect. For such reasons, as alternatives therefore, various flame retardants of the so-called non-halogen type have been developed.

In recent years, as a non-halogen type flame retardant, attention has been paid to a metal hydrate of magnesium hydroxide or the like. Magnesium hydroxide is a nontoxic inorganic substance, and contains no halogen to be also environment-friendly; thus, this compound has come to be widely used as a typical non-halogen type flame retardant. For example, Patent Document 1 discloses that as a covering material for electric wires/cables, a flame retardant is used which contains magnesium hydroxide surface-treated with, for example, an epoxy-type silane coupling agent.

PRIOR ART DOCUMENTS

Patent Documents

Patent. Document 1: JP-A-2013-189522
Patent. Document 2: JP-A-2008-10303

SUMMARY OF THE INVENTION

Problems to be Solved by the Invention

However, the following has been found out by the inventors' investigations: when magnesium hydroxide is used as a flame retardant for electric wire/cable covering material, this flame retardant is usable without causing any problem under ordinary conditions; however, in accordance with a site where an electric wire, a cable or the like is located, this flame retardant may be used under severe conditions (for example, an acidic atmosphere or high-humidity condition); in such a case, magnesium hydroxide reacts with, for example, a strong acid (such as nitric acid or sulfuric acid) so that a soluble salt such as magnesium nitrate or magnesium sulfate may precipitate; accordingly, the outer surface of the electric wire/cable covering material may be lowered in electronic insulation to cause malfunctions of electronic instruments or others. It has also been found out that magnesium hydroxide reacts with carbon dioxide gas, so that basic magnesium carbonate particles precipitate which have a size of several tens of micrometers to damage the external appearance of an outer surface of the electric wire/cable covering material (whitening with carbon dioxide gas).

Patent Document 2 describes an electric wire/cable covering resin composition including aluminum hydroxide of a boehmite type. However, a purpose of a boehmite type aluminum hydroxide as described in Patent Document 2 is to decrease an out gas in quantity for using this substance in a clean room. It has been made clear by the inventors' investigations that the resultant covering material is not sufficient in mechanical properties or others.

Thus, an object of the present invention is to provide alumina hydrate particles, a flame retardant and a resin composition that are each for an electric wire/cable covering material improvable in flame retardancy and mechanical properties while the covering material keeps acid resistance; such an electric wire/cable; and producing methods thereof.

Means for Solving the Problems

The inventor has repeatedly made eager investigations to find out that the above-mentioned problems can be solved by adopting technical solutions described below. As a result, the present invention has been accomplished.

Accordingly, alumina hydrate particles of the present invention for electric wire/cable covering material have an average particle size of 0.5 to 2.5 µm, and having a primary particle variation P of 24% or less, the variation R being represented by the following expression:

primary particle variation $R(\%)$="standard deviation $\sigma(\mu m)$ of major axis diameters of the primary particles"/"average value (µm) of the major axis diameters of the primary particles"×100.

In the invention, various physical properties are each a value measured by a method adopted in Examples and others.

The alumina hydrate particles of the present invention for electric wire/cable covering material are constituted to include the alumina hydrate, which is not easily dissolved in acid. Thus, even when an electric wire/cable or the like is set under a severe condition (for example, an acidic atmosphere or high-humidity condition), the electric wire/cable can maintain acid resistance. Furthermore, about the alumina hydrate particles of the present invention for electric wire/cable covering material, the primary particle variation R is within the above-mentioned range, so that the hydrate particles can be improved in flame retardancy and mechanical properties. A mechanism therefore is unclear; however, the mechanism would be as follows: in a case where the primary particle variation R is within the range, the particles are not easily aggregated when blended with a resin, so that the particles are evenly dispersed therein with ease. Furthermore, the contact area of the particles with the resin is easily controlled. It is presumed that these facts make it possible to improve the flame retardancy which the alumina hydrate particles have, and improve the particles in mechanical properties such as tensile strength and tensile elongation.

The alumina hydrate particles of the present invention preferably have a BET specific surface area of 2.5 to 10 $m^2/g$. This case improves the particles in dispersibility in a resin or the like, and makes it easy to control the contact area of the particles with the resin or the like when the particles are blended with the resin or the like. Thus, the particles easily express flame retardancy and mechanical properties, so that the advantageous effects of the present invention are easily gained with a higher certainty.

The alumina hydrate particles of the present invention preferably include boehmite, which is an alumina monohydrate. Boehmite is slightly poorer in endothermic energy amount than magnesium hydroxide. However, boehmite can release water molecules, which are large in endothermic energy amount, when heated. Thus, boehmite is relatively high in endothermic energy amount, and easily expresses flame retardancy, so that the advantageous effects of the present invention are easily gained with a higher certainty. Moreover, boehmite is higher in heat resistance than magnesium hydroxide. Thus, it is not feared that boehmite generates foam or the like even when shaped and worked at a higher temperature of 300 to 500° C. Furthermore, boehmite is not easily dissolved in acid, is high in chemical stability, and is not dissolved and produces no soluble salt even when boehmite contacts acid rain or the like. Thus, the surface of the electric wire/cable covering material is not lowered in electric insulation, and is not whitened with carbon dioxide.

The alumina hydrate particles of the present invention are preferably surface-treated with at least one surface treating agent selected from the group consisting of higher aliphatic acids, higher aliphatic acid alkaline earth metal salts, coupling agents, esters each made from an aliphatic acid and a polyhydric alcohol, and phosphates each made from phosphoric acid and a higher alcohol. This case makes it possible to heighten the particles in dispersibility when the particles are blended with a resin or the like, so as to be more useful for improving the mechanical properties.

A flame retardant of the present invention is the flame retardant for electric wire/cable covering material that comprises alumina hydrate particles surface-treated with a surface treating agent, wherein the surface-treated alumina hydrate particles have an average particle size of 0.5 to 2.5 μm, and have a primary particle variation R of 24% or less, the variation R being represented by the following expression: primary particle variation R (%)="standard deviation σ (μm) of major axis diameters of the primary particles"/"average value (μm) of the major axis diameters of the primary particles"×100.

In the same manner as described above, this case can improve the flame retardant further in flame retardancy and mechanical properties while the flame retardant maintains acid resistance. Furthermore, the flame retardant of the present invention includes the alumina hydrate particles surface-treated with the surface treating agent. This case makes it possible to heighten the flame retardant in dispersibility when the flame retardant is blended into a resin or the like, and is useful for improving the mechanical properties.

In the flame retardant of the present invention, the surface-treated alumina hydrate particles preferably have a BET specific surface area of 2.5 to 10 $m^2/g$. This case improves the particles in dispersibility in a resin or the like, and makes it easy to control the contact area of the particles with the resin or the like when the particles are blended with the resin or the like. Thus, the particles easily express flame retardancy and mechanical properties, so that the advantageous effects of the present invention are easily gained with a higher certainty.

In the flame retardant of the present invention, the alumina hydrate preferably includes boehmite, which is an alumina monohydrate. Boehmite has the above-mentioned features. This case is more useful for producing the advantageous effects of the present invention.

The resin composition of the present invention for electric wire/cable covering material preferably includes a polyolefin resin, and the above-defined flame retardant in an amount of 5 to 500 parts by mass for 100 parts by mass of the polyolefin resin. In this case, this composition is a resin composition into which the flame retardant of the present invention is blended in the predetermined amount; thus, when this resin composition is used for an electric wire/cable covering material, the material is further improved in flame retardancy and mechanical properties while maintaining acid resistance.

The electric wire/cable of the present invention preferably has a covering material formed using the above-defined resin composition. In this case, the electric wire/cable has the converting material, which includes the resin composition of the present invention, so that the electric wire/cable can be further improved in flame retardancy and mechanical properties while maintaining acid resistance.

The method of the present invention for producing alumina hydrate particles for electric wire/cable covering material includes: pulverizing an alumina trihydrate to give a BET specific surface area of 4.0 $m^2/g$ or more; and subsequently subjecting the resultant to a hydrothermal reaction under a condition of a temperature from 100 to 300° C. By controlling the value of the BET specific surface area at the time of the pulverizing, crystal growth of the primary particles is easily controlled when the pulverized particles are caused to undergo hydrothermal reaction. Thus, particles good in dispersibility can be yielded, so that the advantageous effects of the present invention are easily gained with a higher certainty. This case makes it possible to produce alumina hydrate particles for electric wire/cable coveting material that are further improved in flame retardancy and mechanical properties while the particles maintain acid resistance.

In the method of the present invention for producing alumina hydrate particles, at the time of the pulverizing, it is preferred that the alumina trihydrate is pulverized to give an average particle size of 10 μm or less. This case improves the resultant alumina hydrate particles in dispersibility in a resin or the like, and makes it easy to control the contact area of the particles with the resin or the like when the particles are blended with the resin or the like. Thus, the particles express flame retardancy and mechanical properties easily, so that the advantageous effects of the present invention are easily gained with a higher certainty.

In the method of the present invention for producing alumina hydrate particle, it is preferred that the alumina hydrate particles yielded by the hydrothermal reaction are surface-treated with a surface treating agent under a condition of a temperature from 1 to 200° C. This case makes it possible to heighten the particles in dispersibility when the particles are blended with a resin or the like, so as to be more useful for improving the mechanical properties.

In the method of the present invention for producing alumina hydrate particles, it is preferred that the resultant alumina hydrate particles include boehmite, which is an alumina monohydrate in this case, boehmite has the above-mentioned features, so that the case is more useful for expressing the advantageous effects of the present invention.

In the method of the present invention for producing alumina hydrate particles, it is preferred that the resultant alumina hydrate particles have an average particle size of 0.5 to 2.5 μm, and have a primary particle variation R of 24% or less, the variation R being represented by the following expression: primary particle variation R (%)="standard deviation σ (μm) of major axis diameters of the primary particles"/"average value (μm) of the major axis diameters of the primary particles"×100.

This case is more useful for expressing the advantageous effects of the present invention, as described about the mechanism.

MODE FOR CARRYING OUT THE INVENTION

[Alumina Hydrate Particles]

Figure 1:
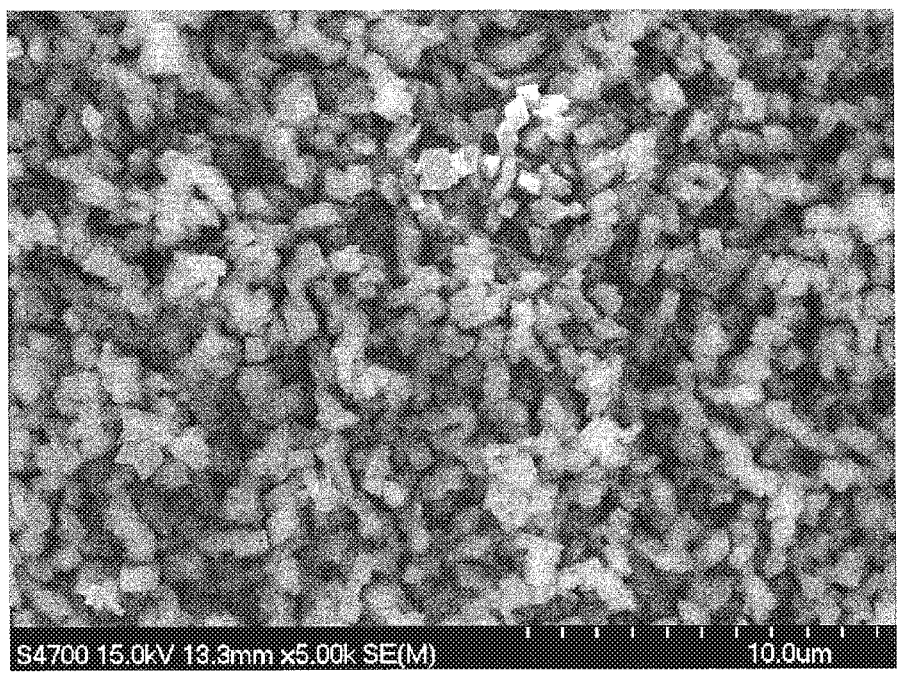
FIG. 1 is a scanning electron microscopic (FESEM) photograph of surface-treated boehmite particles in Example 1.

The alumina hydrate particles of the present invention are made of powder containing, as a main component, an alumina hydrate, and the proportion of the alumina hydrate, which is the main component, is preferably 95% or more, more preferably 98% or more, even more preferably 99% or more. In accordance with, for example, a producing method of the alumina hydrate, the alumina hydrate may contain an impurity component originating from a raw material thereof. Examples of the impurity component include compounds of a metal such as iron, copper, manganese, chromium, cobalt, nickel or vanadium; and compounds of, for example, silicon, calcium, sulfur, or sodium. The content of each of these impurities in the alumina hydrate particles is desirably 0.1% or less by mass of the particles, the content being in terms of the content of the impurity element. The alumina hydrate is chemically stable, and shows acid resistance and non-toxicity, and the alumina hydrate itself is not burned, and is decomposed to be endothermic and is decomposed to release water molecules, which are large in thermal capacity. For such reasons, the alumina hydrate has excellent properties for a non-halogen flame retardant. The alumina hydrate particles of the present invention include, in the category thereof, a single particle or plural particles (such as an aggregate of particles).

In the present invention, the alumina hydrate is, for example, an alumina monohydrate (typically represented as a composition of, for example, AlOOH or $Al_2O_3 \cdot H_2O$); an alumina trihydrate (typically represented as a composition of, for example, $Al(OH)_3$ or $Al_2O_3 \cdot 3H_2O$); or an alumina gel. The alumina hydrate particles of the present invention preferably contain at least one selected from the group consisting of alumina monohydrates, alumina trihydrates, and alumina gels. In order to be improved in, for example, flame retardancy and mechanical properties, the alumina hydrate particles more preferably contain an alumina monohydrate, and/or an alumina trihydrate, and even more preferably contain an alumina monohydrate.

In the present invention, the alumina monohydrate is, for example, boehmite, or diaspore. The alumina hydrate particles of the present invention preferably contain boehmite, which is an alumina monohydrate, to be improved in chemical stability, heat resistance, flame retardancy, and others.

In the present invention, boehmite is typically represented by a composition of AlOOH or $Al_2O_3 \cdot H_2O$. However, boehmite includes, in the category thereof, the so-called pseudo-boehmite, in which one or more molecules of water are contained between layers. In the invention, boehmite may be, for example, mineral boehmite or synthetic boehmite, and may contain water in a proportion of about 15 to 40% mass. In the invention, boehmite is heated to be capable of releasing water molecules, which are large in thermal capacity, to improve the alumina hydrate particles easily in flame retardancy and mechanical properties although boehmite is slightly poorer in performance for the improvement than magnesium hydroxide.

Examples of the alumina trihydrate in the present invention include gibbsite and Bayerite. As described above, in the invention, gibbsite is typically represented by a composition of $Al(OH)_3$ or $Al_2O_3 \cdot 3H_2O$. In the invention, the alumina gel is, for example, amorphous aluminum hydroxide.

The alumina hydrate particles of the present invention have an average particle size of 0.5 to 2.5 μm. The average particle size is preferably from 0.7 to 2.3 μm, more preferably from 1.0 to 2.0 μm, even more preferably from 1.0 to 1.5 μm to improve the particles further in dispersibility, flame retardancy, mechanical properties and others. When the particles are blended into a resin or the like, such an average particle size makes it easy to control a contact area between the particles and the resin or the like to improve the particles in flame retardancy and mechanical strength.

In the alumina hydrate particles of the present invention, the primary particle variation R thereof is 24% or less. The primary particle variation R is preferably 23% or less, more preferably 22% or less to improve the particles further in dispersibility, flame retardancy, mechanical properties, and others. The lower limit value of the primary particle variation R is not particularly limited, and is preferably 10% or more, more preferably 13% or more, even more preferably 15% or more to improve the flame retardant in fillability in a resin.

In order to improve the alumina hydrate particles of the present invention further in dispersibility, flame retardancy, mechanical properties and others, the average value of respective major axis diameters of the particles is preferably from 0.1 to 5.0 μm, more preferably from 0.3 to 2.5 μm, even more preferably from 0.5 to 1.0 μm through a scanning electron microscope.

In order to improve the alumina hydrate particles of the present invention further in dispersibility, flame retardancy, mechanical properties and others, the standard deviation σ of the respective major axis diameters is preferably from 0.01 to 1.0 μm, more preferably from 0.05 to 0.5 μm, even more preferably from 0.1 to 0.3 μm through a scanning electron microscope.

In order to improve the alumina hydrate particles of the present invention further in dispersibility, flame retardancy, mechanical properties and others, the BET specific surface area thereof is preferably from 2.5 to 10 m²/g, more preferably from 3.0 to 9.0 m²/g, even more preferably from 3.0 to 8.0 m²/g.

The shape of the primary particles of the alumina hydrate particles of the present invention may be any one of cubic, planar, amorphous, and needle shapes. From the viewpoint of the flame retardancy, the mechanical strength, and others, the shape of the primary particles is preferably made cubic by controlling the pH of a precursor of the particles to a pH in the vicinity of from alkalinity to neutrality at the time of hydrothermal treatment of the precursor. When the shape is substantially cubic, the shape may be a shape such that a cubic shape is somewhat deformed, for example, a shape that vertexes of a cube are made round. More preferably, the shape is made cubic controlling the pH of the precursor of the particles to a pH in the vicinity of neutrality at the hydrothermal treatment time.

The alumina hydrate particles of the present invention are preferably surface-treated, for example, using a surface treating agent. The surface treating agent may be a known compound used for a purpose of such an agent. Examples thereof include higher aliphatic acids, higher aliphatic acid alkaline earth metal salts, coupling agents, esters each made from in dispersibility, the alumina hydra to particles of the present invention are preferably surface-treated with at least one surface treating agent selected from the group consisting of higher aliphatic acids, higher aliphatic acid alkaline earth metal salts, coupling agents, esters each made from an aliphatic acid and a polyhydric alcohol, and phosphates each made from phosphoric acid and a higher alcohol. In order to be improved in mechanical properties, the alumina hydrate particles of the present invention are preferably surface-treated with at least one surface treating agent selected from the group consisting of higher aliphatic acids, higher aliphatic acid alkaline earth metal salts, and coupling agents. A polyorganosiloxane may be used.

Examples of the coupling agents include silane-based coupling agents such as γ-glycidoxypropyltrimethoxysilane, β-(3,4-epoxycyclohexyl)ethyltrimethoxysilane, γ-methacryloxypropyltrimethoxysilane, γ-methacryloxypropyltriethoxysilane, γ-acryloxypropylmethyl dimethoxysilane, vinyltriethoxysilane, vinyltriacetoxysilane, p-trimethoxysilylstyrene, p-triethoxysilylstyrene, p-trimethoxysilyl-α-methylstyrene, p-triethoxysilyl-α-methylstyrene, 3-aminopropyltrimethoxysilane, 3-aminopropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltrethoxysilane, N-phenyl-3-aminopropyltrimethoxysilane, N-phenyl-3-aminopropyltriethoxysilane, N-propyl-3-aminopropyltrimethoxysilane, 4-aminobutyltrimethoxysilane, and decyltrimethoxysilane; titanate-based coupling agents such as isopropyitriisostearoyl titanate, isopropyltris(dioctylpyrophosphate) titanate, isopropyltri(N-aminoethyl-aminoethyl) titanate, and isopropyltridecylbenzenesufonyl titanate; and aluminum-based coupling agents such as acetoalkoxyaluminum diisopropylate. The use of any coupling agent, such as a silane coupling agent, is preferred to improve the dispersity of the particles in a resin (or in a shaped body) or improve the tensile strength. These coupling agents may be used alone or in any combination of two or more thereof.

Examples of the higher fatty acids include higher fatty acids each having 10 or more carbon atoms, such as stearic acid, erucic acid, palmitic acid, lauric acid, and behenic acid. Stearic acid is preferred from the viewpoint of dispersibility and handleability. Examples of the higher fatty acid alkali metal salts include alkali metal salts of the above-mentioned higher fatty acids. The alkali metal is preferably lithium, sodium, potassium or the like. The higher fatty acid alkali metal salts are preferred from the viewpoint of dispersibility. Of these salts, sodium stearate is more preferred. These acids or salts may be used alone or in any combination of two or more thereof.

Examples of the esters made from a fatty acid and a polyhydric alcohol include esters made form a polyhydric alcohol such as glycerin monostearate or glycerin monooleate and a fatty acid; and the like.

Examples of the phosphates made from phosphoric acid and a higher alcohol include a monoester made from orthophosphoric acid and oleyl alcohol, stearyl alcohol or the like, a diester made from the same, or a mixture of the two esters. The monoester, the diester or the mixture may be a phosphate in an acid form, or in the form of an alkali metal salt, an amine salt or the like.

Preferred examples of the surfactant include anionic surfactants, cationic surfactants, amphoteric surfactants, and nonionic surfactants.

Examples of the anionic surfactants include alkylsulfate salts such as sodium laurylsulfate, sodium higher alcohol sulfate, and triethanolamine laurylsulfate; alkylbenzene sulfate salts such as sodium dodecylbenzenesulfate, alkylnaphthalene sulfate salts such as sodium alkylnapthalenesulfate; alkylsulfosuccinate salts such as sodium dialkylsulfosuccinate; alkyldiphenyl ether disulfate salts such as sodium alkyldiphenyl ether disulfate; alkylphosphate salts such as potassium alkylphosphate; polyoxyethylene alkyl (or alkylallyl) sulfate salts such as sodium polyoxyethylene lauryl ether sulfate, sodium polyoxyethylene alkyl ether sulfate, triethanolamine polyoxyethylene alkyl ether sulfate, and sodium polyoxyethylene alkylphenyl ether sulfate; and the like.

Examples of the cationic surfactants and amphoteric surfactants include alkylamine salts such as coconutamine acetate and stearylamine acetate; quaternary ammonium salts such as lauryltrimethylammonium chloride, stearyltrimethylammonium chloride, cetyltrimethylammonium chloride, distearyldimethylammonium chloride, and alkylbenzyldimethylammonium chloride; alkylbetaines such as laurylbetaine, stearylbetaine, and laurylcarboxymethylhydroxyethylimidazolinium betaine; amine oxides such as lauryldimethylamine oxide; and the like.

Examples of the nonionic surfactants include polyoxyethylene alkyl ethers such as polyoxyethylene lauryl ether, polyoxyethylene cetyl ether, polyoxyethylene stearyl ether, polyoxyethylene oleyl ether, and polyoxyethylene higher-alcohol ether; polyoxyethylene alkylaryl ethers such as polyoxyethylene nonylphenyl ether; polyoxyethylene derivatives; sorbitan fatty acid esters such as sorbitan monolaurate, sorbitan monopalmitate, sorbitan monostearate, sorbitan tristearate, sorbitan monooleate, sorbitan trioleate, sorbitan sesquioleate, and sorbitan distearate; polyoxyethylene sorbitan fatty acid esters such as polyoxyethylene sorbitan monolaurate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as polyoxyethylene sorbet tetraoleate; glycerin fatty acid esters such as glycerol monostearate, glycerol monooleate, and self-emulsifying glycerol monostearate; polyoxyethylene fatty acid esters such as polyethylene glycol monolaurate, polyethylene glycol monostearate, polyethylene glycol distearate, and polyethylene glycol monooleate; polyoxyethylene alkylamines; polyoxyethylene hardened castor oil; and alkylalkanolamides.

In the present invention, about the content of the surface treating agent, the alumina hydrate particles may contain the surface treating agent in a proportion of about 0.1 to 5% by mass of the alumina hydrate particles, the proportion of the particles being 100% by mass.

The alumina hydrate particles of the present invention include, in the category thereof, both of particles in a case where the particles are alumina hydrate particles that have not yet been surface-treated, and particles in a case where the particles are alumina hydrate particles that have been surface-treated. Individual physical property values of the alumina hydrate particles that have not yet been surface-treated are as described above. However, the proportion of surface-treated moieties of the particles is a slight proportion of the alumina hydrate particles, so that values adopted as individual physical properties of the alumina hydrate particles that have been surface-treated may be substantially equal to those of the alumina hydrate particles that have not yet been surface-treated. Thus, a description of the values adopted as individual physical properties of the alumina hydrate particles that have been surface-treated is omitted herein.

The alumina hydrate particles of the present invention are characterized by being used for electric wire/cable covering material. The electric wire/cable covering material is, for example, a covering material for electric wires/cables used in automobile vehicles, railway vehicles, ships, aircrafts, industrial machines, electronic instruments, and electronic components.

[Method for Producing Alumina Hydrate Particles]

The method of the present invention for producing alumina hydrate particles is characterized by pulverizing a raw material of the particles in advance before being caused to undergo hydrothermal reaction. The method of the present invention for producing alumina hydrate particles will be described on the basis of a method for producing alumina monohydrate particles (for example, boehmite particles), which is a typical example of the method of the invention. However, the invention is not limited to the example described below as far as the example is not beyond the subject matter of the invention.

In the case of producing alumina monohydrate particles (for example, boehmite particles), an alumina trihydrate or the like, which is a raw material of the particles, is pulverized, and then the pulverized alumina trihydrate is caused to undergo hydrothermal treatment (hydrothermal reaction) to yield a slurry. Next, the slurry is subjected to, for example, filtration, water washing, drying, pulverization and classification. In this way, desired alumina monohydrate particles (for example, boehmite particles) can be produced. Hereinafter, about the same points as described above, descriptions thereof may be appropriately omitted.

The raw material may be, for example, an alumina trihydrate or an alumina gel. From the viewpoint of the producibility of the alumina monohydrate, the use of an alumina trihydrate is preferred. As described above, examples of the alumina trihydrate include qibbsite and bayerite. The use of gibbsite is preferred to improve the resultant alumina hydrate particles in mechanical properties. The alumina trihydrate, the alumina gel, or the like, which is the raw material, may be any one of natural products and synthetic products, and may be produced as will be described later. The alumina trihydrate may also be a commercially available product. The alumina trihydrate (for example, gibbsite) may be synthesized, for example, by the hydrolysis of an alkaline solution of aluminic acid (Bayer method), or by the ripening of an alumina gel in a highly alkaline solution (for example, pH=about 12). The alumina gel (for example, amorphous aluminum hydroxide) may be synthetized, for example, by adding a solution of sodium hydroxide to an aqueous solution of aluminum chloride to produce a precipitation at a pH of about 8 to 11, and then ripening the precipitation in the mother liquid for about 24 hours.

The average particle size of the raw material (for example, an alumina trihydrate) is preferably 15 μm or less, more preferably from 0.5 to 15 μm, even more preferably from 1.0 to 12 μm from the viewpoint of improvements of the resultant alumina hydra to particles in flame retardancy and mechanical properties. From the same viewpoint as described above, the BET specific surface area of the raw material (for example, an alumina trihydrate) is preferably 1 $m^2/g$ or more, more preferably from 1 to 10 $m^2/g$.

When the alumina trihydrate or the like, which is the raw material, is pulverized, this material may be dry-pulverized, or wet-pulverized. As far as the advantageous effects of the present invention are not damaged, any pulverizing method may be used. In the case of performing, for example, the dry-pulverizing, the method may be, for example, a method of pulverizing the alumina trihydrate, which is the raw material, mechanically to give, for example, a desired BET specific surface area or average particle size. Using, for example, a batch-type ball mill, the raw material may be dry-pulverized. The material of the mill is not particularly limited. It is preferred to use ball-form media made of, for example, alumina or zirconia in a ball mill the inside of which is lined with, for example, silica stone, alumina or rubber. It is preferred to dry-pulverize the alumina trihydrate or the like, which is the raw material, in a pot mill made of alumina at a rotation number of 20 to 200 rpm for about 0.1 to 48 hours. Thereafter, the dry-pulverized alumina trihydrate or the like is added into, for example, pure water to prepare a suspension, and this suspension is subjected to hydrothermal treatment, which will be detailed later. In this way, a slurry can be yielded.

In the case of performing, for example, the wet-pulverizing, the alumina trihydrate or the like, which is the raw material, is added into, for example, pure water to prepare a suspension, and this suspension is pulverized. In this way, the wet-pulverizing can be attained. In the addition into the water, a dispersing agent or the like may be appropriately used. Examples of an instrument suitable for the wet-pulverizing include a batch-type ball mill, a continuous-type bead mill, a wet jet mill, a Discoplex, a tower mill, a circular vibrating mill, a spirally-moving vibrating mill, a planetary pulverizer, a sand grinder, an atomizer, a pulverizer, a super-micron mill, and a colloid mill. The instrument is not particularly limited as far as the instrument is usable in a wet manner. Out of these instruments, a batch-type ball mill or continuous-type bead mill is preferred since the raw material is easily pulverized into fine particles without lowering the particles in flatness by over-pulverization.

In general, the concentration in the suspension is preferably from 5 to 30% both inclusive by mass, more preferably from 7 to 25% both inclusive by mass. When this suspension is passed through the above-mentioned wet-pulverizer 1 to 5 times at a flow rate of about. 1 to 20 L/hour, the wet-pulverizing can be attained to give, for example, a desired BET specific surface area or average particle size.

At the time of the pulverizing, the alumina trihydrate or the like is pulverized to give a BET specific surface area of 4.0 m$^2$/g or more, preferably 4.5 m$^2$/g or more, even more preferably 10 m$^2$/g or more. In this case, the upper limit value of the BET specific surface area is not particularly limited as far as the advantageous effects of the present invention are not damaged. In order to prevent the particles from aggregating, the trihydrate or the like is pulverized preferably into a BET specific surface area that is preferably 50 m$^2$/g or less, more preferably 30 m$^2$/g or less, even more preferably 20 m$^2$/g or less. At the pulverizing time, conditions for the pulverizing are adjusted to set the ratio of the BET specific surface area after the pulverizing to that before the pulverizing ("the BET specific surface area after the pulverizing"/"that before the pulverizing") preferably to a value of about 1.2 to 10.

At the pulverizing time, the alumina trihydrate is pulverized to give an average particle size that is preferably 10 μm or less, more preferably 8.0 μm or less, even more preferably 6.0 μm or less. In this case, the upper limit value of the average particle size is not particularly limited as far as the advantageous effects of the present invention are not damaged. In order to improve the alumina hydrate particles in mechanical properties, the trihydrate is pulverized into an average particle size that is preferably 0.1 μm or more, more preferably 0.5 μm or more. At the pulverizing time, conditions for the pulverizing are adjusted to set the ratio of the average particle size after the pulverizing to that before the pulverizing ("the average particle size after the pulverizing"/"that before the pulverizing") preferably to a value of about 0.3 to 0.9.

At the time of the hydrothermal treatment, in order to cause the hydrothermal reaction under a temperature condition of 100 to 300° C. to improve the particles in dispersibility, the hydrothermal reaction is conducted under a temperature condition preferably from 140 to 250° C., more preferably from 170 to 210° C. At the hydrothermal treatment time, a period for the hydrothermal reaction is not particularly limited, and is preferably from about 1 to 24 hours from the viewpoint of, for example, production costs of the alumina hydrate particles.

The resultant alumina hydrate particles (for example, alumina monohydrate particles) preferably contain boehmite, which is an alumina monohydrate, from the viewpoint of the endothermic energy amount, heat resistance, chemical stability and other factors of the particles. The resultant alumina monohydrate particles (for example, boehmite particles) may contain not only an alumina monohydrate but also an alumina trihydrate and/or an alumina gel, which originate (s) from the raw material since the alumina monohydrate particles are produced, using, for example, gibbsite or an alumina gel as a raw material. In other words, the alumina hydrate particles of the present invention partially undergoes an advance of conversion into boehmite so as to be represented as a mixture of boehmite with aluminum hydroxide (typically represented by $[Al(OH)_3]_{1-x}[AlO(OH)]_x$ wherein $0<x\leq1$). In the composition formula, the range of x is preferably $0.5\leq x\leq1$, more preferably $0.7\leq x\leq0.98$, even more preferably $0.8\leq x\leq0.95$. The value "x" can be gained from the fraction X of boehmite-conversion of the particles, this fraction being to be later detailed.

The resultant alumina hydrate particles preferably have an average particle size of 0.5 to 2.5 μm and a primary particle variation R of 24% or less to be improved in acid resistance, flame retardancy, and mechanical properties.

The alumina hydrate particles (the slurry) yielded by the hydrothermal reaction are preferably surface-treated by a surface treating agent to be improved in dispersibility. More specifically, it is preferred to heat the slurry subjected to the hydrothermal treatment, add a surface treating agent thereto to surface-treat the particles, and next subject the particles to filtration, washing, drying, pulverizing, and/or some other. The alumina monohydrate particles (dried particles) yielded through the above-mentioned steps may be surface-treated by adding the surface treating agent to the particles. As described above, however, when the alumina hydrate particles (slurry) is surface-treated, it is sufficient to perform, one time, a process of filtration, washing, drying, pulverizing, and/or some other. Thus, producing steps of the particles can be decreased to heighten the production efficiency thereof.

At the time of the surface treatment, a temperature condition of the heating is a temperature condition preferably from 1 to 200° C., more preferably from 50 to 100° C. to promote the surface treatment. About a period of the treatment at this time, the slurry is heated for a period preferably from about 0.5 to 5 hours.

As the surface treating agent, any one of the above-mentioned surface treating agents may be used without any restriction. To improve the particles in dispersibility, the surface treating agent is preferably a higher aliphatic acid alkali metal salt, in particular preferably sodium stearate. When the higher aliphatic acid alkali metal salt is used, the addition quantity of the surface treating agent is adjusted preferably into a value of 0.1 to 10% by mass of the alumina monohydrate, the proportion of the monohydrate being 100% by mass, and the value being in terms of the quantity of the higher aliphatic acid.

In order to use a surface treating agent as described above to surface-treat the alumina hydrate particles (for example, alumina monohydrate particles), a known dry manner or a wet manner may be used. From the viewpoint of the evenness of the treatment, the use of the wet manner is preferred. In the dry manner, it only needed that: while the alumina hydrate particles are stirred by a mixer such as a Henschel mixer, a surface treating agent in the form of a liquid, emulsion or solid is added to the particles; and then the particles are sufficiently mixed with each other while heated or not heated. In the wet manner, it is only needed that: a surface treating agent in a solution or emulsion state is added to an aqueous solvent or non-aqueous solvent slurry; the resultant is mechanically blended into the alumina hydrate particles at a temperature of, for example, about 1 to 100° C.; and subsequently, when the solvent is the nonaqueous solvent, the nonaqueous solvent is removed by, for example, drying. Examples of the nonaqueous solvent include isopropyl alcohol, and methyl ethyl ketone. The addition quantity of the surface treating agent may be appropriately selected. The adoption of the dry manner is apt to make the resultant surface treatment level more uneven than that of the wet manner. Thus, in the dry manner, the addition quantity is better to be made slightly larger than in the wet manner. Specifically, the addition quantity ranges preferably from 0.5 to 10% by mass, more preferably from 1 to 5% by mass of the alumina hydrate particles, the percentage of the particles being 100% by mass. When the wet manner is adopted, the addition quantity ranges preferably from 0.1 to 5% by mass, more preferably from 0.3 to 3% by mass of the alumina hydrate particles, the percentage thereof being 100% by mass, from the viewpoint of a sufficient surface treatment and the prevention of the surface treating agent from aggregating.

Individual physical property values of the alumina hydrate particles that have not yet been surface-treated are as described above. However, the proportion of surface-treated moieties of the particles is a slight proportion of the alumina hydrate particles, so that values adopted as individual physical properties of the alumina hydrate particles that have been surface-treated may be substantially equal to those of the alumina hydrate particles that have not yet been surface-treated.

The surface-treated alumina hydrate particles are subjected to filtration (for example, vacuum-filtration) and washing with water (having, for example, a mass 5 times or more that of the solid in the resultant alumina hydrate particles), and then the particles may be optionally subjected to one or more selected appropriately from drying, pulverization, classification, and other manners.

[Flame Retardant]

The flame retardant of the present invention for electric wire/cable covering material contains alumina hydrate particles surface-treated with a surface treating agent. The alumina hydrate particles surface-treated with the surface treating agent have been as described about the alumina hydrate particles and others. Thus, any description thereof is omitted. Furthermore, in the flame retardant of the present invention for electric wire/cable covering material, the surface-treated alumina hydrate particles have an average particle size of 0.5 to 2.5 μm, and a primary particle variation R of 24% or less. As stated above, about the same points as described above, descriptions thereof may be appropriately omitted.

In the flame retardant of the present invention, the surface-treated alumina hydrate particles preferably have a BET specific surface area of 2.5 to 10 $m^2$/g. The alumina hydrate in the present invention preferably contains boehmite, which is an alumina monohydrate. Other values adopted as individual physical properties of the flame retardant have been as described about the alumina hydrate particles and others. Thus, descriptions of the values are omitted.

As far as the advantageous effects of the present invention are not damaged, other additives may be blended into the flame retardant of the present invention. Examples of such additives include an antioxidant, an antistatic agent, a pigment, a foaming agent, a plasticizer, a filler, a reinforcing agent, any other flame retardant, a flame retardant aid, a crosslinking agent, a light stabilizer, an ultraviolet absorbent, and a lubricant. The respective blend quantities of the other additives are not particularly limited from the viewpoint that the quantities are permissible as far as the quantities do not damage the advantageous effects of the present invention.

For example, the flame retardant aid is preferably a red phosphorus, or a carbon powder, or a mixture of the two. The red phosphorus may be, besides an ordinary red phosphorus for flame retardants, for example, a red phosphorus surface-coated with a thermosetting resin, polyolefin, carboxylic acid polymer, titanium oxide, or titanium-aluminum condensed product. The carbon powder may be, for example, a carbon black, activated carbon or graphite. This carbon black may be prepared by any one of an oil furnace method, a gas furnace method, a channel method, a thermal method, and an acetylene method.

The flame retardant of the present invention for electric wire/cable covering material can be produced, for example, by pulverizing an alumina trihydrate or the like, which is a raw material, causing the pulverized alumina trihydrate to undergo hydrothermal treatment (hydrothermal reaction) to yield a slurry, surface-treating the slurry next with a surface treating agent, and then subjecting to filtration, water-washing, drying, pulverization, classification and/or some other.

The flame retardant of the present invention is used for electric wire/cable covering material. The electric wire/cable covering material is, for example, a covering material for electric wires/cables used in automobile vehicles, railway vehicles, ships, aircrafts, industrial machines, electronic instruments, and electronic components.

[Resin Composition]

In the resin composition of the present invention, the above-defined flame retardant is blended into a polyolefin resin in an amount preferably from 5 to 500 parts, more preferably from 100 to 200 parts by mass for 100 parts by mass of the polyolefin resin. In order to improve the flame retardant in dispersibility, the flame retardant can be blended thereinto in an amount more preferably from 130 to 170 parts by mass for 100 parts by mass of the polyolefin resin.

A resin contained in the resin composition may be PVC or the polyolefin. The polyolefin is preferred from the viewpoint of safety when the composition is burned, and environment preservation. Specific examples of the polyolefin include polyethylenes (PEs) such as low density polyethylene (LDPE), middle density polyethylene (HDPE), high density polyethylene (HDPE), very low density polyethylene (VLDPE) and linear low density polyethylene (LLDPE), polypropylene (PP), ethylene/ethyl acrylate copolymer (EEA), ethylene/methyl acrylate copolymer (EMA), ethylene/ethyl methacrylate copolymer, ethylene/vinyl acetate copolymer (EVA), ethylene/propylene copolymer (EP), ethylene/propylene/diene copolymer (EPDM), and polyisobutylene. Usable is also, for example, a polymer by copolymerizing ethylene with an α-olefin such as propylene, butane, pentene, hexane or octene, or with a cyclic olefin through a metallocene catalyst. These polymers may be used alone or in a mixture form.

As far as the advantageous effects of the present invention are not damaged, the following may be blended into the resin composition of the invention, as required: any other flame retardant, a flame retardant aid, a plasticizer, a softener, an antiaging agent, a filler, a working aid, a crosslinking agent, a crosslinking aid, a lubricant, a colorant, and any other additive.

The resin composition of the present invention can easily be produced by using an ordinary kneading machine, such as a Bunbury mixer, a tumbler, a pressuring kneader, a kneading extruder or a mixing roller, to knead the above-mentioned individual components evenly.

When the resin composition is used to make a tensile test thereof in the present invention, the tensile strength is preferably 1.05 kgf/$mm^2$ or more, more preferably 1.1 kgf/$mm^2$ or more to cause the composition to express mechanical properties. The upper limit value of the tensile strength is not particularly limited, and is preferably 10 kgf/$mm^2$ or less from the viewpoint of the practicability of the composition. In the same way, the tensile elongation of the composition is preferably 600% or more, more preferably 700% or more. The upper limit value of the tensile elongation is not particularly limited, and is preferably 3000% or less from the viewpoint of the practicability. From the viewpoint of the flame retardancy, the oxygen index of the composition is preferably 29.0 or more, more preferably 30.0 or more. The upper limit value of the oxygen index is not particularly limited, and is preferably 50.0 or less from the viewpoint of the practicability.

The resin composition of the present invention is usable for an electric wire/cable/any-other-article covering material for various use purposes as described above. The electric wire/cable/any-other-article covering material is usable as an electrically insulating material, a sheath material, a tape and an interposed material for various electric wires/cables, such as insulated electric wires, electric wires for electronic instrument wiring, electric wires for automobiles, electric wires for machines, electric power cords, insulated electric wires for outdoor switchboards, cables for power supply, controlling cables, cables for telecommunication, cables for instrumentation, cables for signals, mobile cables, and cables for ships. The coveting material is also usable for cases, plugs, tapes and other attachment components for electric wires/cables; and electric wire tubes and other electric material products. The covering material is also usable for sheets for agriculture, hoses for water supply, gas tube covering materials, building interiors, household furniture material, toy materials, floor materials, and others.

[Electric Wire/Cable]

The electric wire/cable of the present invention has a covering material formed using the above-defined resin composition. For example, the electric wire is formed to have an electric conductor such as copper, and an electrically insulating layer made of a covering material formed by using the above-defined resin composition onto the electric conductor to cover the conductor, and then optionally cross-linking the composition in a usual way. In this case, the electric wire/cable of the present invention can be produced, for example, by extruding the resin composition on/over the outer circumference of the electric conductor, directly or with another cover therebetween, to cover the outer circumference, or by shaping the resin composition into a tape form, and then winding the shaped composition onto the outer circumference.

In an embodiment of the electric wire of the present invention, the electrically insulating layer may have a monolayered structure, or a multilayered structure specific example of the multilayered structure may be a structure yielded by extruding, as its outermost layer, the resin composition, and extruding, as its layer other than the outermost layer, a polyolefin resin (for example, polyethylene resin) or rubbery material to cover its inner layer(s). Furthermore, for example, a separator, or knitting and braiding may be applied to the resultant, as required.

The conductor diameter of the electric conductor, and the raw material and other factors of the electric conductor are not particularly limited, and may be appropriately determined in accordance with the purpose of the electric wire.

For example, the cable is formed to have an electric wire, and a sheath formed by using the above-defined resin composition onto the outside of the electric wire to cover the electric wire. In the same manner as in the electric wire, in one embodiment of the cable of the present invention, its sheath may have a monolayered structure or a multilayered structure.

The electric wire/cable of the present invention is usable as an electric wire/cable covering material for various use purposes as described above, and is usable as, for example, various electric wires/cables, such as insulated electric wires, electric wires for electronic instrument wiring, electric wires for automobiles, electric wires for machines, electric power cords, insulated electric wires for outdoor switchboards, cables for power supply, controlling cables, cables for telecommunication, cables for instrumentation, cables for signals, mobile cables, and cables for ships.

EXAMPLES

Hereinafter, the present invention will be described in detail by way of Examples; however, the invention is not limited to Examples described below as far as the invention is not beyond the gist thereof.

[Raw Material, Flame Retardant, and Resin Composition Evaluations]

Flame retardants, and others yielded in working examples and comparative examples were analyzed as described below. Individual results of the analysis are shown in Table 1, and FIGS. 1 to 4.

(1) BET Specific Surface Area

A sample powder was pre-treated, using eight continuous-preheater units (manufactured by Mountech Co., Ltd.) in a nitrogen gas atmosphere at 130° C. for about 30 minutes, and the BET specific surface area of the sample powder was measured by a nitrogen gas adsorption method, using a BET specific surface area measuring device Macsorb HM Model-1208 (manufactured by Mountech Co., Ltd.).

(2) Average Particle Size

Into a 100-mL-volume baker was put 50 mL of ethanol, and about 0.2 g of a sample powder was put thereinto. This system was subjected to ultrasonic treatment (according to a product UD-201 manufactured by Tony Seiko Co., Ltd.) for 3 minutes to prepare a dispersion liquid. A particle size distribution meter (Microtrac HRA Model 9320-X100, manufactured by Nikkiso Co., Ltd.) according to a laser diffraction method was used to measure the volume-standard $D_{50}$ value of this prepared liquid as the average particle size (μm) thereof.

(3) Ignition Loss $I_3$

Into a magnetic crucible having an already-known weight, a sample was precisely weighed into about 2 g. The sample was spread into an even thickness, and put into a furnace of 900° C. temperature to be ignited for 2 hours or longer. Thereafter, the sample was cooled to room temperature in a desiccator, and then precisely weighed to gain the reduced weight thereof.

<Fraction X of Conversion into Boehmite>

The fraction of conversion of the sample into boehmite is calculated out in accordance with an expression described below.

$$X = (I_1 - I_3)/(I_1 - I_2)$$
$$= (34.6 - I_3)/19.6$$

in which X: fraction-conversion of the sample into boehmite, $I_1$: theoretical ignition loss value of aluminum hydroxide=34.6(%), $I_2$: theoretical ignition loss value of boehmite=15.0(%), and $I_3$: actually measured value of the ignition loss of the sample (ignited at 900° C. for 2 hours).

(4) Scanning Electron Microscope (Average Value of Major Axis Diameters, Standard Deviation σ of Major Axis Diameters, and Primary Particle Variation R)

A double-sided tape was bonded onto an aluminum sample holder. From above this system, a spatula was used to apply a sample powder onto the system to trace the holder. Gold was vapor-deposited thereon, and then a scanning electron microscope (FE-SEM: S-4700, manufactured by Hitachi Ltd.) was used to photograph the sample at 5000 magnifications. FIGS. 1 to 4 each show an SEM photograph.

An image analysis software (Image J) was used to select 100 particles in the photograph at random, and then the average value and the standard deviation σ of major axis diameters of primary particles therein were gained. About the major axis diameters of the primary particles, the respective dimensions of each of the particles to be measured were measured in individual directions, and the dimension (i.e., the longest diameter) of the particle in a direction along which the largest dimension was gained, out of the directions, was defined as the major axis diameter of the primary particle. Furthermore, the primary particle variation R was gained in accordance with an expression described below.

primary particle variation R (%)="standard deviation σ(μm) of major axis diameters of the primary particles"/"average value (μm) of the major axis diameters of the primary particles"×100.

(5) Tensile Test (Tensile Strength, and Tensile Elongation)

As a polyolefin resin, an EVA (ethylene vinyl acetate) resin was used (trade name: EV-180; maker: Du Pont Mitsui Polychemicals Co., Ltd.). A Laboplast mill (manufactured by Toyo Seiki Co., Ltd.) was used to melt-blend/knead 150 parts by mass of a flame retardant which will be specified later into 100 parts by mass of the EVA resin at 180° C. for 5 minutes. The resultant kneaded body was press-formed at 180° C. into a sheet-shaped-body of 2 mm thickness. This sheet-shaped-body was punched out into a #2 shaped dumbbell form. The resultant test piece was used, and the tensile strength and the tensile elongation thereof were measured in accordance with JIS-K-7113. A target value of the tensile strength was 1.05 kgf/mm$^2$ or more, and a target value of the tensile elongation was 600% or more.

(6) Oxygen Index (Flame Retardancy)

In the same way as in the item (5) described above, a #A-1 shaped-body (length: 150 mm, width: 6.5 mm, and thickness: 3 mm) was yielded. In accordance with JIS-K-7201, the oxygen index thereof was measured. A target value thereof was determined to be 29.0 or more.

EXAMPLE 1

To 4.0 L of pure water was added 1.0 kg of gibbsite (trade name: MARTINAL 01-104; maker: Huber Corp.; average particle size ($D_{50}$ value): 2.22 μm; BET specific surface area: 3.9 m$^2$/g), and the resultant was stirred to prepare a gibbsite suspension liquid. This suspension liquid was passed 2 times through a wet-manner pulverizer (machine name: Dyno-Mill; maker: Shinmaru Enterprises Corp.) in which glass beads having a diameter of 1 mm and 1.0 L volume were filled into a vessel (vessel volume: 1.5 L) at a flow rate of 10 L/hour to wet-pulverize the gibbsite. The thus pulverized gibbsite suspension liquid was caused to flow into an autoclave, 3 L in volume, having a liquid-contacting region made of hastelloy C-276 to subject the liquid to hydrothermal treatment at 180° C. for 12 hours while the liquid was stirred. In this way, boehmite was synthesized (this slurry after the synthesis was partially filtrated and dried to yield a non-treated boehmite powdery sample for the measurement of ignition loss, and that of fraction of conversion into boehmite).

While the hydrothermal-treated boehmite slurry cooled to room temperature was stirred, the slurry was heated to 70° C. Thereafter, an aqueous solution of sodium stearate that was adjusted into a concentration of 5% by mass at 70° C. was added to the slurry to give a concentration of 0.6% by mass of any solid in the boehmite. The resultant was stirred at 70° C. for 1 hour to surface-treat the boehmite particles in a wet manner. After the surface treatment, the slurry was vacuum-filtrated, and then sufficiently washed with pure water having a volume 5 times or more the mass of the solid in the boehmite. Thereafter, the resultant was dried and pulverized to yield a flame retardant powder.

EXAMPLE 2

A flame retardant powder was yielded in the same way as in Example 1 except steps described below.

Into a 5-L-volume pot mill made of alumina was filled 1.0 kg of gibbsite (trade name: B-303; maker: Almorix Ltd.; average particle size ($D_{50}$): 6.91 μm; BET specific surface area: 3.1 m$^2$/g), and further 4 kg of zircon balls of 10 mm diameter were filled thereinto. Thereafter, the gibbsite particles were dry-pulverized (machine name: Universal Ball Mill UBM-4; maker: Yamato Scientific Co., Ltd.) at a rotation number of 80 rpm for one day. The thus pulverized gibbsite of 600 g weight was collected. Thereto was added 3 L of pure water, and the resultant was stirred to prepare a gibbsite suspension liquid. This suspension liquid was caused to flow into an autoclave, 3 L in volume, having a liquid-contacting region made of hastelloy C-276. While stirred, the liquid was subjected to hydrothermal treatment at 195° C. for 5 hours to synthesize boehmite.

EXAMPLE 3

A flame retardant powder was yielded in the same way as in Example 1 except that gibbsite (trade name: ATH-10; maker: TAIXING COMPANY; average particle size ($D_{50}$): 10.80 μm; BET specific surface area: 2.0 m$^2$/g) was used, and was passed through the wet-pulverizer one time at a flow rate of 5 L/hour to subject the gibbsite to hydrothermal treatment at 190° C. for 12 hours.

EXAMPLE 4

A flame retardant powder was yielded in the same way as in Example 1 except that gibbsite (trade name: APYRAL40CD; maker: Nabaltec AG; average particle size ($D_{50}$): 1.48 μm; BET specific surface area: 3.2 m$^2$/g) was used, and was passed through the wet-pulverizer one time at a flow rate of 10 L/hour to subject the gibbsite to hydrothermal treatment at 185° C. for 10 hours.

COMPARATIVE EXAMPLE 1

A flame retardant powder was yielded in the same way as in Example 3 except that no wet-pulverization was performed in Example 3.

COMPARATIVE EXAMPLE 2

A flame retardant powder was yielded in the same way as in Example 1 except that no wet-pulverization was performed in Example 1.

COMPARATIVE EXAMPLE 3

Into pure water was added a commercially available boehmite powder (trade name: Serra-sur BMB-1; maker: Kawai Lime Industry Co., Ltd.) which was not surface-treated to prepare a suspension liquid having a concentration of 20 g/dL. This suspension liquid was used, and the same surface treatment as in Example 1 was conducted to yield a flame retardant powder.

Table 1 shows results of the above-mentioned analyses and evaluations.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Raw material | Raw material name | Gibbsite | Gibbsite | Gibbsite | Gibbsite | Gibbsite | Gibbsite | Boehmite |
|  | Average particle size (D50)(μm) | 2.22 | 6.91 | 10.80 | 1.48 | 10.80 | 2.22 | BMB-1 |
|  | BET specific surface area (m²/g) | 3.9 | 3.1 | 2.0 | 3.2 | 2.0 | 3.9 |  |
| Pulverization | Conditions | Wet pulverization, passage 2 times at 10 L/hr. | Dry pulverization, at 80 rpm for one day | Wet pulverization, passage one time at 5 L/hr. | Wet pulverization, passage one time at 10 L/hr. | None | None |  |
|  | Average particle size (D50)(μm) | 0.94 | 5.92 | 5.09 | 1.06 | 10.80 | 2.22 |  |
|  | BET specific surface area (m²/g) | 18.3 | 4.5 | 12.9 | 8.5 | 2.0 | 3.9 |  |
| Hydrothermal reaction | Conditions | 180° C. × 12 hrs. | 195° C. × 5 hrs. | 190° C. × 12 hrs. | 185° C. × 10 hrs. | 190° C. × 12 hrs. | 180° C. × 12 hrs. |  |
| Properties of non-treated boehmite particles | Ignition loss (%) | 16.9 | 16.5 | 16.7 | 16.8 | 16.7 | 16.9 | 16.7 |
|  | Fraction X (—) of conversion to boehmite | 0.90 | 0.92 | 0.91 | 0.91 | 0.91 | 0.90 | 0.91 |
| Surface treating agent (St acid) | Conditions | 0.60% | 0.60% | 0.60% | 0.60% | 0.60% | 0.60% | 0.60% |
| Properties of surface-treated boehmite particles | Average particle size (D50)(μm) | 1.19 | 1.30 | 1.34 | 1.28 | 2.80 | 1.53 | 0.67 |
|  | BET specific surface area (m²/g) | 4.2 | 6.8 | 3.3 | 5.3 | 2.3 | 2.7 | 6.2 |
|  | Major axis diameter average (μm) through SEM | 0.81 | 0.55 | 0.93 | 0.76 | 1.40 | 1.02 | 0.68 |
|  | Major axis diameter standard deviation σ (μm) through SEM | 0.18 | 0.11 | 0.15 | 0.18 | 0.31 | 0.28 | 0.17 |
|  | Primary particle variation R (%) | 22 | 20 | 16 | 24 | 22 | 27 | 25 |
| Resin composition physical properties | Tensile strength (kgf/mm²) | 1.17 | 1.16 | 1.15 | 1.07 | 0.79 | 0.91 | 0.94 |
|  | Tensile elongation (%) | 1600 | 750 | 1250 | 950 | 310 | 350 | 370 |
|  | Oxygen index (—) | 29 | 30 | 30 | 29 | 27 | 28 | 29 |

As shown in Table 1, about the flame retardants of Comparative Examples 1 and 2, the raw material thereof was not pulverized in advance. Such cases were bad in mechanical properties such as tensile strength and tensile elongation, and in oxygen index. Thus, expected results were unable to be gained. The surface-treated commercially available product, as in Comparative Example 3, was also large in primary particles variation R, so that aggregation was caused in the resin. Thus, the product was bad in mechanical properties such as tensile strength and tensile elongation.

In contrast, the flame retardants in Examples 1 to 4 were able to gain desired results about their mechanical properties such as tensile strength and tensile elongation, and oxygen index. Thus, these examples gave good results. This would be because when the flame retardants in Examples 1 to 4 are each blended into the EVA resin, the particles are less easily aggregated so that the particles are evenly dispersed with ease, and further the contact area between the flame retardant and the resin is easily controlled.

Figure 2:
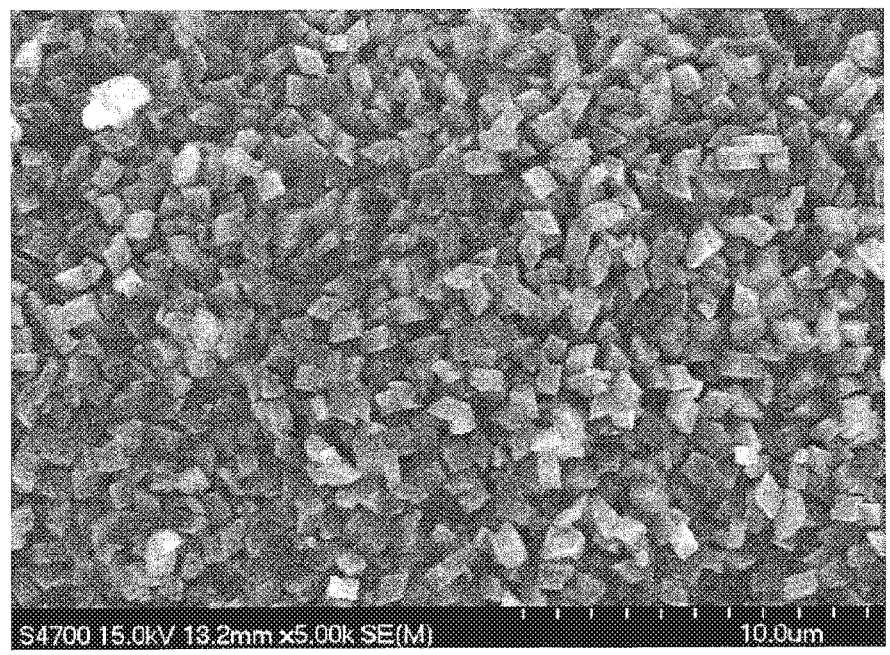
FIG. 2 is a scanning electron microscopic (FESEM) photograph of surface-treated boehmite particles in Example 1.
Figure 3:
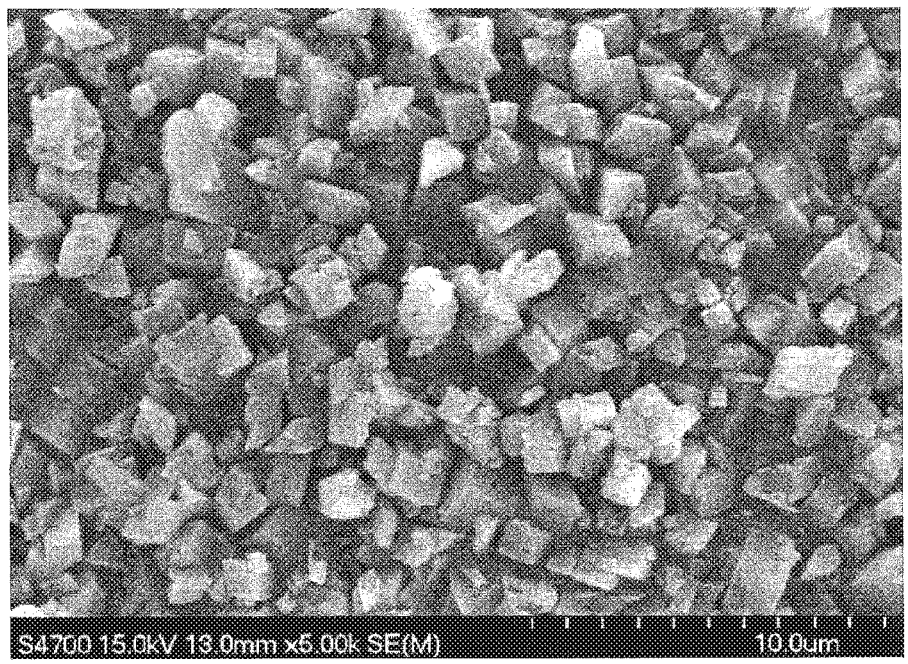
FIG. 3 is a scanning electron microscopic (FESEM) photograph of surface-treated boehmite particles in Comparative Example 1.
Figure 4:
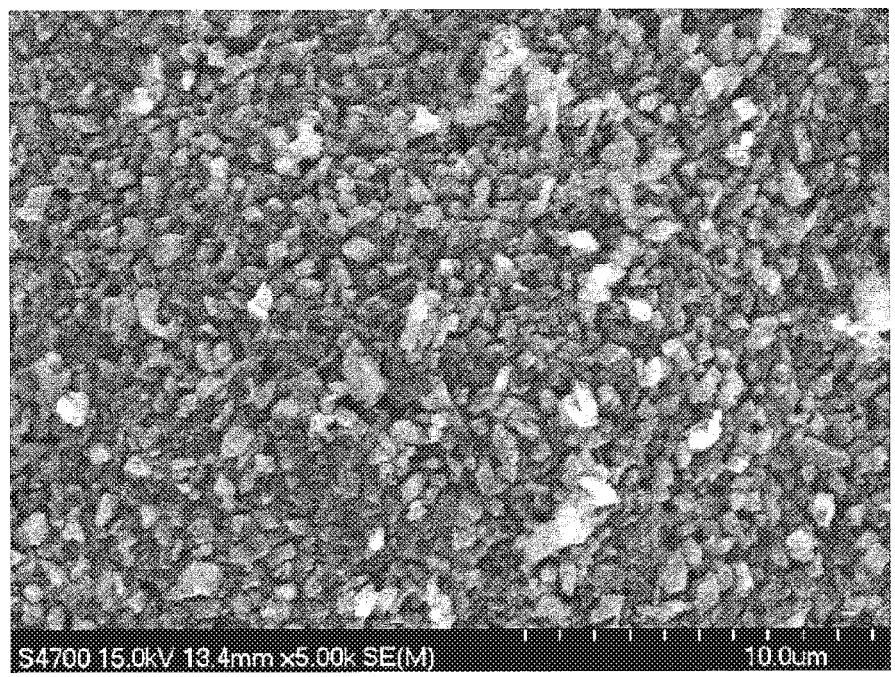
FIG. 4 is a scanning electron microscopic (FESEM) photograph of surface-treated boehmite particles in Comparative Example 3.

FIGS. 1, 2, 3 and 4 show respective scanning electron microscopic (FESEM) photographs of the surface-treated boehmite particles in Example 1, Example 3, Comparative Example 1, and Comparative Example 3. As shown in FIGS. 1 and 2, it was verifiable that the flame retardants in Examples 1 and 3 were small in particle size variation of the primary particles (the particle size was even), in contrast, as shown in FIGS. 3 and 4, it was understood that the flame retardants in Comparative Examples 1 and 3 were large in particle size variation of the primary particles.

The invention claimed is:

1. Alumina hydrate particles for electric wire/cable covering material, having an average particle size of 0.5 to 2.5 μm, having a BET specific surface area of 2.5 to 10 m²/g, and having a primary particle variation R of 24% or less, the variation R being represented by the following expression:
primary particle variation R (%)="standard deviation σ(μm) of major axis diameters of the primary particles"/"average value (μm) of the major axis diameters of the primary particles"×100.

2. The alumina hydrate particles according to claim 1, comprising boehmite, which is an alumina monohydrate.

3. The alumina hydrate particles according to claim 1 which are treated with at least one surface treating agent selected from the group consisting of higher aliphatic acids, higher aliphatic acid alkaline earth metal salts, coupling agents, esters each made from an aliphatic acid and a polyhydric alcohol, and phosphates each made from phosphoric acid and a higher alcohol.

4. A flame retardant for electric wire/cable covering material that comprises alumina hydrate particles surface-treated with a surface treating agent,
wherein the surface-treated alumina hydrate particles have an average particle size of 0.5 to 2.5 μm, have a BET specific surface area of 2.5 to 10 m²/g, and have a primary particle variation R of 24% or less, the variation R being represented by the following expression:
primary particle variation R (%)="standard deviation σ(μm) of major axis diameters of the primary particles"/"average value (μm) of the major axis diameters of the primary particles"×100.

5. The flame retardant according to claim 4, wherein the alumina hydrate comprises boehmite, which is an alumina monohydrate.

6. A resin composition for electric wire/cable covering material, comprising a polyolefin resin, and the flame retardant recited in claim 4 in an amount of 5 to 500 parts by mass for 100 parts by mass of the polyolefin resin.

7. An electric wire/cable, comprising a covering material formed using the resin composition recited in claim 6.

* * * * *